(12) United States Patent
Kempshall et al.

(10) Patent No.: US 11,994,585 B2
(45) Date of Patent: May 28, 2024

(54) STANDOFF DETECTION SYSTEM

(71) Applicant: SMITHS INTERCONNECT, INC., Tampa, FL (US)

(72) Inventors: Scott Robert Kempshall, Saint Petersburg, FL (US); James Allan Wilkerson, Jr., Melbourne, FL (US); Jared Greenberg, Northampton, MA (US)

(73) Assignee: SMITHS INTERCONNECT, INC., Tampa, FL (US)

( * ) Notice: Subject to any disclaimer, the term of this patent is extended or adjusted under 35 U.S.C. 154(b) by 672 days.

(21) Appl. No.: 17/259,750

(22) PCT Filed: Jul. 24, 2019

(86) PCT No.: PCT/US2019/043306
§ 371 (c)(1),
(2) Date: Jan. 12, 2021

(87) PCT Pub. No.: WO2020/023673
PCT Pub. Date: Jan. 30, 2020

(65) Prior Publication Data
US 2021/0149047 A1 May 20, 2021

Related U.S. Application Data

(60) Provisional application No. 62/702,800, filed on Jul. 24, 2018.

(51) Int. Cl.
*G01S 17/04* (2020.01)
*G01S 7/51* (2006.01)
(Continued)

(52) U.S. Cl.
CPC .............. *G01S 17/04* (2020.01); *G01S 7/51* (2013.01); *G01S 17/89* (2013.01); *G06V 20/64* (2022.01)

(58) Field of Classification Search
CPC ...... G01S 13/88; G01S 13/887; G01S 13/888; G01S 17/04; G01S 7/51; G01S 17/89; G06V 20/64
See application file for complete search history.

(56) References Cited

U.S. PATENT DOCUMENTS 4,866,424 A * 9/1989 Parks ...................... G01T 1/167
340/572.1
5,859,609 A * 1/1999 Sheen ...................... G01S 7/412
342/179

(Continued)

FOREIGN PATENT DOCUMENTS

| CN | 101769879 A | 7/2010 |
| CN | 106291732 A | 1/2017 |

(Continued)

OTHER PUBLICATIONS

International Search Report and Written Opinion of the International Searching Authority (dated Nov. 8, 2019) for Corresponding International PCT Patent Application No. PCT/US2019/043306, filed Jul. 24, 2019.

(Continued)

*Primary Examiner* — Peter M Bythrow
(74) *Attorney, Agent, or Firm* — SNELL & WILMER LLP

(57) ABSTRACT

Methods and systems for detecting objects in a three-dimensional space. The method includes emitting, by a plurality of transmitters oriented in a respective plurality of directions, signals to produce uniform millimeter wave illumination of the three-dimensional space. The method includes determining object data including a direction, a phase, and a timing of signals reflected from one or more objects within the three-dimensional space. The method includes detecting, by a processor, the one or more objects in the three-dimensional space based on the object data. The (Continued)

method includes rendering, by the processor, an image corresponding to the one or more detected objects.

20 Claims, 4 Drawing Sheets

(51) Int. Cl.
    *G01S 17/89*     (2020.01)
    *G06V 20/64*     (2022.01)

(56) References Cited

U.S. PATENT DOCUMENTS

| | | | | |
|---|---|---|---|---|
| 6,057,761 A * | 5/2000 | Yukl | ............... | A61B 5/0507 340/568.1 |
| 6,094,472 A * | 7/2000 | Smith | ............... | G01V 5/0025 378/86 |
| 6,469,624 B1 * | 10/2002 | Whan | ............... | G06V 10/255 324/243 |
| 6,937,182 B2 * | 8/2005 | Lovberg | ............... | G01V 8/005 342/179 |
| 6,965,340 B1 * | 11/2005 | Baharav | ............... | H01Q 21/065 342/195 |
| 7,180,441 B2 * | 2/2007 | Rowe | ............... | G01S 7/411 342/179 |
| 7,248,204 B2 * | 7/2007 | Lovberg | ............... | H01Q 3/2682 342/179 |
| 7,385,549 B2 * | 6/2008 | Lovberg | ............... | G01V 8/005 342/179 |
| 7,386,150 B2 * | 6/2008 | Fleisher | ............... | G01S 13/887 382/103 |
| 7,583,221 B2 * | 9/2009 | Detlefsen | ............... | G01S 13/87 342/25 A |
| 7,746,266 B2 * | 6/2010 | Zoughi | ............... | G01S 13/89 342/179 |
| 7,978,120 B2 * | 7/2011 | Longstaff | ............... | G01S 13/347 342/179 |
| 8,345,918 B2 * | 1/2013 | Fleisher | ............... | G06V 40/10 382/103 |
| 8,547,274 B2 * | 10/2013 | Reinpoldt, III | ....... | G01S 13/887 342/179 |
| 8,674,875 B2 * | 3/2014 | Carter | ............... | G01S 13/426 342/158 |
| 9,269,152 B1 | 2/2016 | Worley et al. | | |
| 9,316,732 B1 * | 4/2016 | Mohamadi | .......... | G01S 13/0209 |
| 10,302,793 B2 * | 5/2019 | Mrvaljevic | ............... | G01S 7/10 |
| 10,585,203 B2 * | 3/2020 | Rhead | ............... | G01N 27/00 |
| 10,804,942 B2 * | 10/2020 | Hay | ............... | G01S 13/887 |
| 2004/0080448 A1 * | 4/2004 | Lovberg | ............ | H01Q 21/0043 342/179 |
| 2004/0140924 A1 * | 7/2004 | Keller | ............... | G01N 21/3563 342/179 |
| 2004/0178942 A1 | 9/2004 | McLemore | | |
| 2004/0263379 A1 * | 12/2004 | Keller | ............... | G01S 13/887 342/90 |
| 2005/0110672 A1 * | 5/2005 | Cardiasmenos | ... | G01N 21/3581 250/330 |
| 2005/0230604 A1 * | 10/2005 | Rowe | ............... | G01S 7/411 250/221 |
| 2005/0232459 A1 * | 10/2005 | Rowe | ............... | G06V 20/52 250/221 |
| 2006/0017605 A1 * | 1/2006 | Lovberg | ............... | G01K 7/226 342/179 |
| 2007/0052576 A1 | 3/2007 | Hausner et al. | | |
| 2007/0114418 A1 * | 5/2007 | Mueller | ............... | G01J 3/42 250/341.1 |
| 2009/0073023 A1 * | 3/2009 | Ammar | ............... | G01S 13/89 342/22 |
| 2009/0284405 A1 * | 11/2009 | Salmon | ............... | G01V 8/005 342/22 |
| 2009/0289833 A1 * | 11/2009 | Johnson | ............... | H01Q 21/061 342/179 |
| 2010/0182434 A1 | 7/2010 | Koch et al. | | |
| 2010/0214150 A1 * | 8/2010 | Lovberg | ............... | H01Q 15/144 342/22 |
| 2013/0106643 A1 | 5/2013 | Wahlquist et al. | | |
| 2013/0121529 A1 * | 5/2013 | Fleisher | ............... | G01S 7/412 382/103 |
| 2014/0028457 A1 * | 1/2014 | Reinpoldt | ............... | G06V 20/52 340/552 |
| 2015/0030256 A1 * | 1/2015 | Brady | ............... | G01S 17/89 382/254 |
| 2015/0208003 A1 * | 7/2015 | Kuznetsov | .......... | H04N 13/239 348/46 |
| 2015/0379356 A1 * | 12/2015 | Nikolova | ............... | G06V 20/52 342/90 |
| 2016/0209506 A1 * | 7/2016 | Longstaff | ............... | G01S 7/024 |
| 2016/0291148 A1 * | 10/2016 | Ellenbogen | ............... | G01S 13/89 |
| 2017/0307728 A1 | 10/2017 | Eshraghi et al. | | |
| 2017/0329033 A1 * | 11/2017 | Kuznetsov | ............. | G08B 21/02 |
| 2019/0187327 A1 * | 6/2019 | Zhao | ............... | G01S 13/89 |
| 2019/0285740 A1 * | 9/2019 | Boufounos | ......... | G01S 13/9005 |
| 2020/0054236 A1 * | 2/2020 | Qi | ............... | G06T 7/70 |

FOREIGN PATENT DOCUMENTS

| | | |
|---|---|---|
| CN | 106338732 A | 1/2017 |
| CN | 206223985 U | 6/2017 |
| WO | WO2018-032669 | 2/2018 |

OTHER PUBLICATIONS

CNIPA 1$^{st}$ OA with search report dated Dec. 27, 2023 for corresponding CN Application No. 201980046996.0 (with translation), 26 pages.

* cited by examiner

STANDOFF DETECTION SYSTEM

CROSS REFERENCE TO RELATED APPLICATIONS

This application claims the benefit and priority of U.S. Provisional Application Ser. No. 62/702,800, filed Jul. 24, 2018, entitled "Standoff Detection System," the contents of which are herein incorporated by reference in its entirety.

BACKGROUND

1. Field

The invention relates to systems and methods for detecting the location of humans and/or objects within a three-dimensional space.

2. Description of Related Art

There are numerous standoff weapon/contraband detection systems. Some of these current systems detect weapons by using millimeter wave radiation. These frequencies penetrate clothing and reflect more strongly from metal and ceramic objects than from human body surfaces. The resulting 2D images allow detection of hidden weapons. However, these current systems scan one person and require specific positioning and cooperation of the subject. Thus, there is a need for systems and methods for detecting weapons and objects without requiring the cooperation of the subject.

SUMMARY

What is described is a detection system for a three-dimensional space. The detection system includes a plurality of transmitters oriented in a respective plurality of directions and configured to produce uniform millimeter wave illumination of the three-dimensional space. The detection system includes a plurality of receivers configured to determine object data including a direction, a phase, and a timing of signals reflected from one or more objects within the three-dimensional space. The detection system includes a processor configured to receive the object data, detect the one or more objects in the three-dimensional space based on the object data, and render an image corresponding to the one or more detected objects.

Also described is a method for detecting objects in a three-dimensional space. The method includes emitting, by a plurality of transmitters oriented in a respective plurality of directions, signals to produce uniform millimeter wave illumination of the three-dimensional space. The method includes determining object data including a direction, a phase, and a timing of signals reflected from one or more objects within the three-dimensional space. The method includes detecting, by a processor, the one or more objects in the three-dimensional space based on the object data. The method includes rendering, by the processor, an image corresponding to the one or more detected objects.

Also described is a detection device including a plurality of transmitters oriented in a respective plurality of directions and configured to produce uniform millimeter wave illumination of a three-dimensional space. The detection device includes a plurality of receivers configured to determine object data including a direction, a phase, and a timing of signals reflected from one or more objects within the three-dimensional space. The detection device includes a processor configured to receive the object data, detect the one or more objects in the three-dimensional space based on the object data, and render an image corresponding to the one or more detected objects.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

The systems and methods described herein use volume image processing techniques to derive 3D images from a plurality of millimeter wave receivers using coherent millimeter wave illumination of the scanned volume. Because of the ability of millimeter wave frequencies to penetrate clothing and reflect strongly from metal and ceramic surfaces, the system is able to detect hidden weapons within the scanned volume.

Millimeter wave energy is used to form 3D images of a scanned volume by measuring phase and amplitude of reflected energy received by an array of sensors and using digital processing to form the image.

The systems and methods described herein further offer the ability to overlay multiple imaging technique results (e.g., optical or infrared) over the composite image for better detection and detail obfuscation. Detail obfuscation may be important for personal privacy concerns, and may be used to anonymize images by removing facial details, for example.

Conventional systems are limited to scanning one person at a time and require specific positioning and cooperation of the subject being scanned. The systems and methods described herein provide scanning of a larger area with multiple individuals in natural positions and in dynamic conditions, such as walking, standing, or crouching.

Figure 1A:
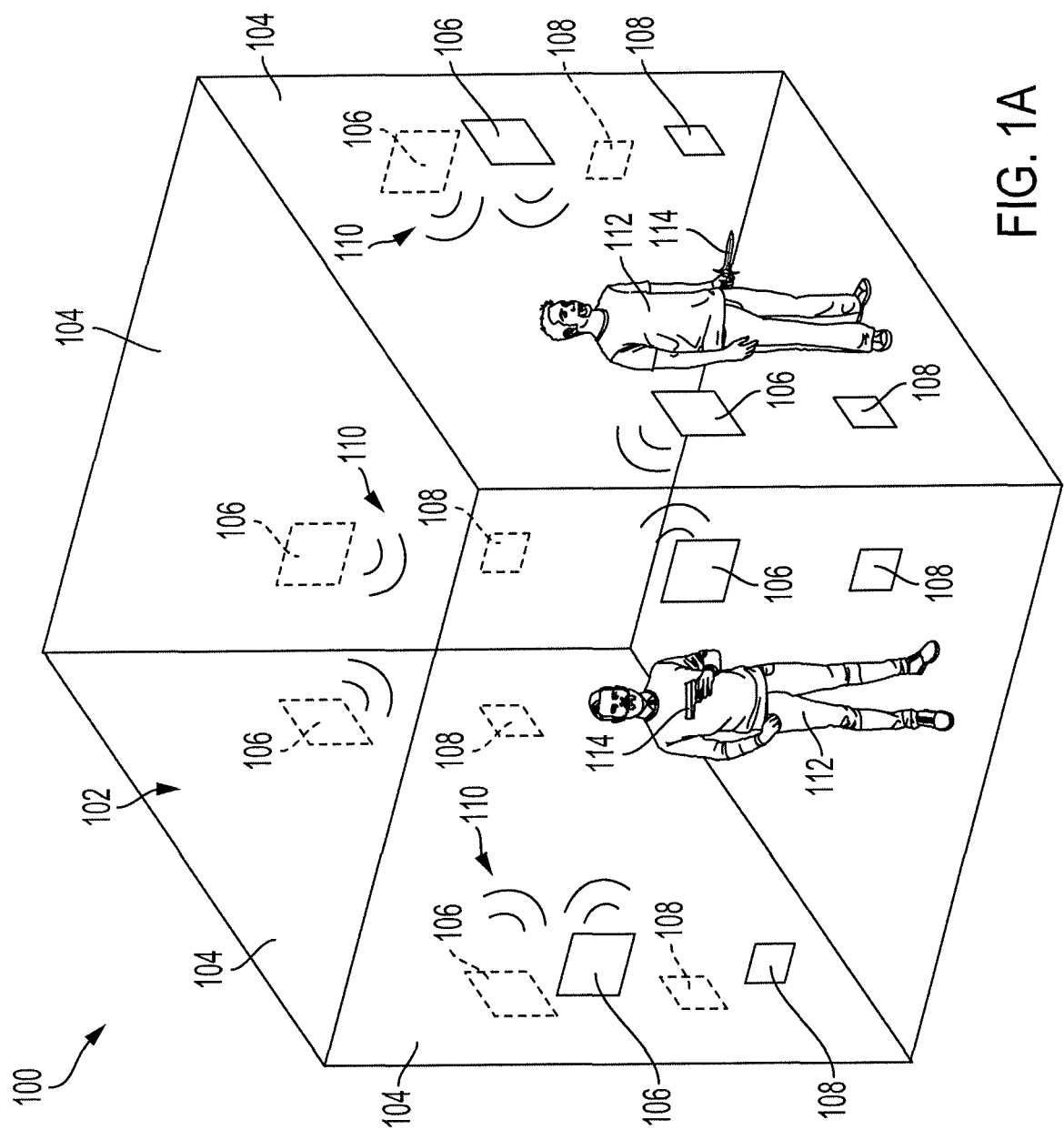
FIG. 1A illustrates the standoff detection system, according to various embodiments of the invention.

FIG. 1A illustrates the standoff detection system 100. The standoff detection system 100 is a volume scanning system for the detection of weapons, contraband, or other metal or ceramic objects concealed on individuals within a particular space. As used herein, "weapon" will be used to describe any weapon, contraband, or other metal or ceramic object that is desired to be detected. This space where weapons and individuals may be located may be referred to as the scan volume 102. There may be one or more individuals 112 within the scan volume 102, and the individuals 112 may have weapons 114, which may be exposed or concealed.

The basic principle of operation is multistatic millimeter wave radar using multiple source transmitters 106 and separate receivers 108. The transmitters 106 and the receivers 108 are placed around the perimeter of the scan volume 102 to allow illumination and observation of the individuals 112 within the scan volume 102 from multiple directions. The scanning of the individuals 112 from multiple directions improves the probability of detecting weapons 114.

Source transmitters 106 use broad beam antennae (e.g., electronically steered antenna arrays) to emit signals 110 to provide uniform illumination of the scan volume 102. The signals 110 are reflected from all surfaces within the scan volume 102 and the receivers 108 (e.g., a low cost bits-to-waves transceiver) use phased array antennae to resolve the direction, the phase and the timing of the reflected signals 110. The receivers 108 use copies of the source waveforms emitted from the transmitters 106 to correlate the received signals and resolve the location and the magnitude of the reflections within the scan volume 102. The digital signal processing and comparison of the received signals from all the receivers 108 using transmissions from each transmitter 106 allow formation of a three-dimensional image of the microwave scattering behavior of any objects within the scan volume 102.

Metal and ceramic objects scatter millimeter wave energy more strongly than most clothing and human body surfaces, so the system 100 will identify areas of interest based on intensity of scattering. The short wavelength of the source signals 110 allows high-resolution imaging so that an automated detection algorithm can use the size and the shape of the highly reflective regions of the image to identify potential weapons. Other sensors (e.g., visible or infrared cameras) can also be accurately directed to further examine target regions to aid in identification. For example, when a suspicious object 114 is detected based on the three-dimensional image generated using the detected signal data from the receivers 108, additional sensors may be activated and directed to the location of the suspicious object 114 for further image detection.

Successive scans by the additional sensors of the same target region can also be used to improve target discrimination. In some embodiments, visual confirmation by a human user may be used to provide feedback to the system to improve target discrimination. Because there are no mechanically scanned antennae, the rate at which the volume can be scanned is limited only by the available image processing power, and can be set high enough to provide near real-time scanning of personnel moving at normal speeds. None of these functions require the cooperation of the individuals scanned, and the antennae and other sensors can be concealed to avoid alerting potential targets.

The ability to scan a large volume (a corridor or a courtyard, for example) without requiring the scanned subjects to maintain any fixed position allows the standoff detection system described herein to be used in a much wider range of applications than the current single person scanners. For example, the standoff detection system can be used to detect weapons in the approaches (or pathways) leading to a venue, before people are tightly packed, allowing easier intervention by security personnel. The ability to scan a volume at very high rates makes the hiding or obfuscation of weapons or contraband far more difficult than when current 2D technologies are used.

The system described herein may be combined with other imaging techniques (e.g., optical, Infrared, multiple RF frequencies) to further enhance the ability to detect weapons or contraband. The 3D technique described herein also makes the specific identification of objects of interest much easier in a standoff environment reducing the possibility of false positives. The use of agile RF beams at high angular rates allows for a general volume scanning and a discrete target scan using the same equipment set.

Figure 1B:
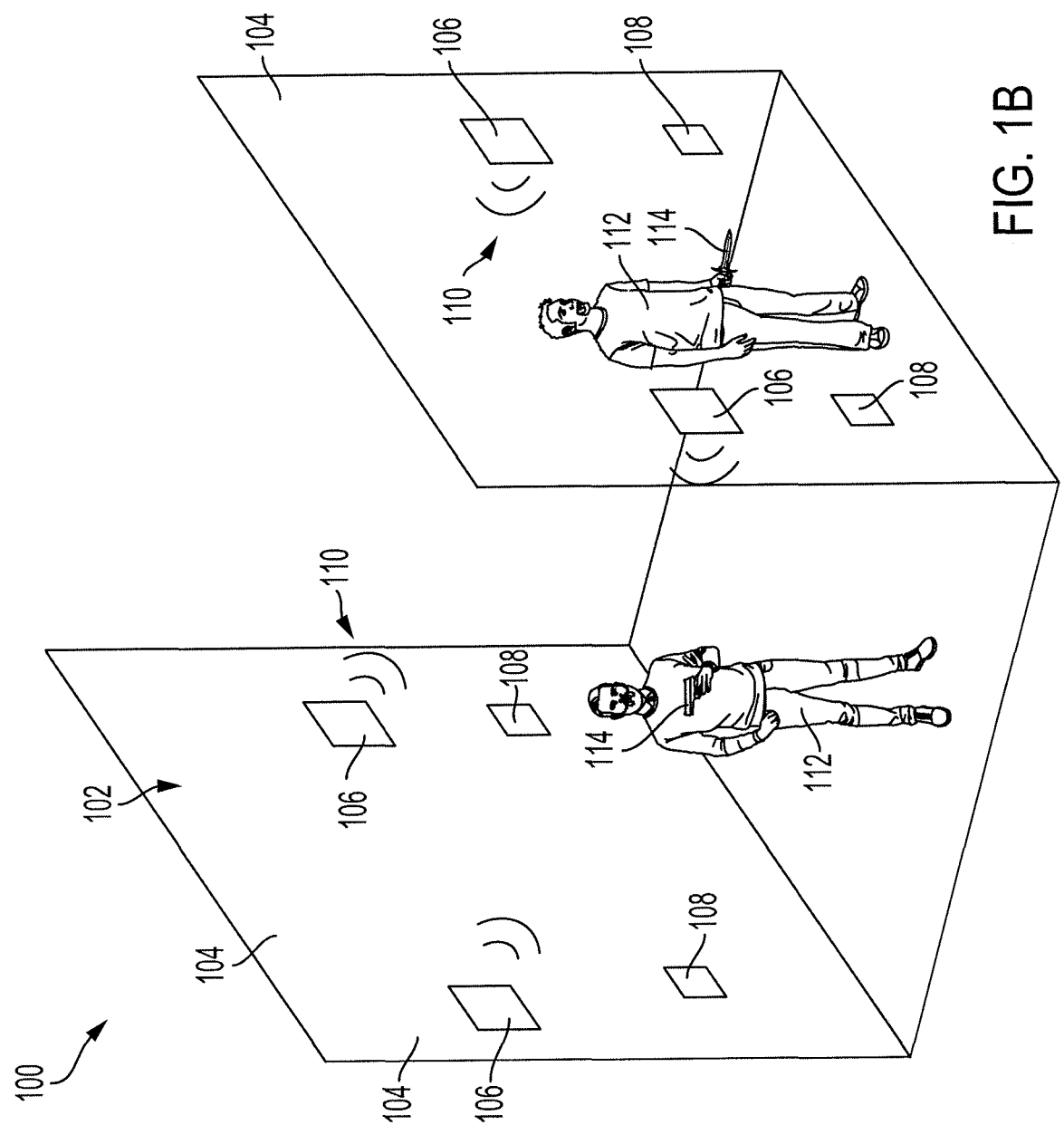
FIG. 1B illustrates the standoff detection system, according to various embodiments of the invention.

FIG. 1A illustrates the system 100 used in a closed space with four walls 104 surrounding the individuals 112. FIG. 1B illustrates the system 100 being used in a hallway or a corridor with two walls 104 surrounding the individuals 112. A minimum of three pairs of transmitters 106 and receivers 108 may be used to generate the three-dimensional image, but additional pairs of transmitters 106 and receivers 108 may be used to enhance the generated three-dimensional image. The transmitters 106 and the receivers 108 may be placed on varying walls 104 to provide a variety of vantage points and angles. For example, a first electronic scanning antenna may be oriented in a northward direction, a second electronic scanning antenna may be oriented in an eastward direction, and a third electronic scanning antenna may be oriented in a southward direction. Generally, the transmitters 106 and the receivers 108 are located on two or more walls, and as used herein, "wall" may refer to any surface that is used to define a space, such as a side wall, a ceiling, or the ground.

The receiver 108 may be a transceiver. Further, the transceiver may be an integrated transceiver/modem device. The transmitter 106 may be an electronic scanning antenna. Further, the electronic scanning antenna may be an electronically steered antenna array for use in Ku/Ka satellite communications application that is tailored to develop a millimeter wave design for use in the standoff detection situation.

In some embodiments, the system may further include supplementary data, such as video imaging, thermal information, spectral information, and/or radio frequency scatter imaging.

The system provides volumetric coverage of moving objects with minimal radiation in non-harmful wavelengths. The system creates an indistinct image of human forms due to scatter technology, and can be designed to perform an area scan or may dwell/track on a specific target.

The systems and methods described herein may be used to provide area coverage in natural flow conditions for the detection of certain weapons or contraband. In some embodiments, the systems and methods described herein may be used in a medical environment to detect objects within or near a patient.

Figure 2:
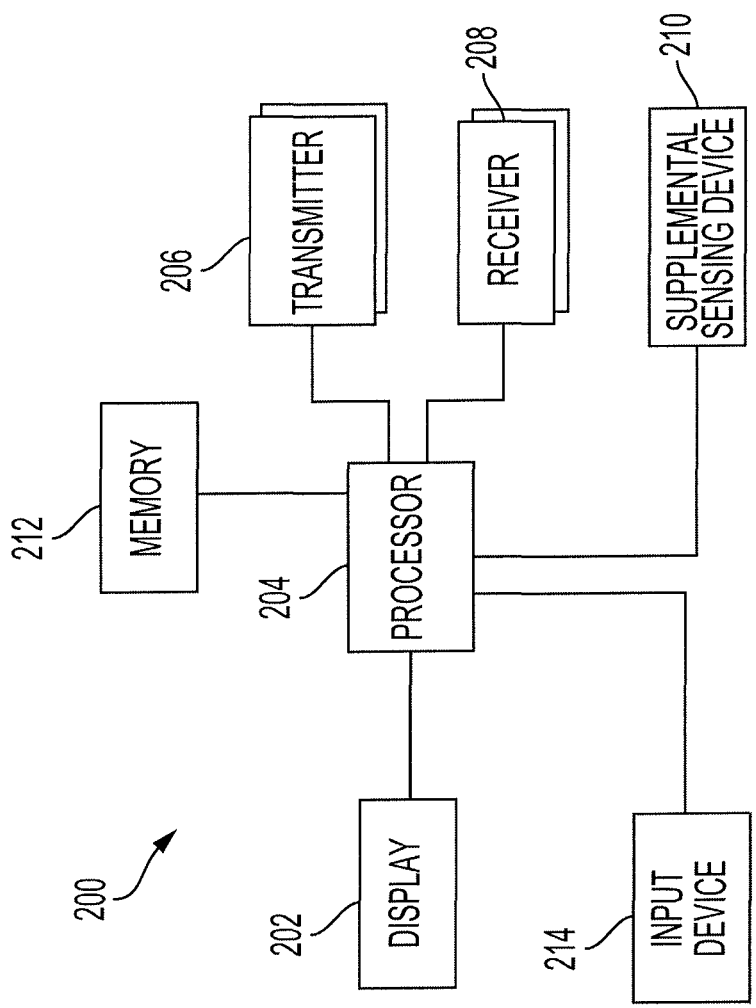
FIG. 2 is a block diagram of the standoff detection system, according to various embodiments of the invention.

FIG. 2 illustrates a system 200 for detecting weapons or contraband in three-dimensional space.

The system 200 includes a plurality of transmitters 206 similar to the transmitter 106 described herein. In some embodiments, the plurality of transmitters 206 are electronic scanning antennas. The system 200 also includes a plurality of receivers 208 similar to the receiver 108 described herein. In some embodiments, the plurality of receivers 208 are transceivers. The plurality of transmitters 206 and the plurality of receivers 208 may be located in a plurality of locations sufficient to cover a three-dimensional space of interest. In some embodiments, at least two of the transmitters in the plurality of transmitters 206 are not coplanar with each other. In some embodiments, at least two of the receivers in the plurality of receivers 208 are not coplanar with each other.

The plurality of transmitters 206 emit microwave signals which are scattered by one or more objects in the scan volume. The plurality of receivers 208 are configured to detect object data associated with the one or more objects in the scan volume. The object data may include a direction, a timing, and a phase of the scattered microwave signals originally emitted from the plurality of transmitters 206. The object data may be detected by comparing the detected scattered microwave signals with the emitted signals from the plurality of transmitters 206. By comparing the deviation of the detected scattered microwave signals from the emitted signal, the object data may be detected.

The plurality of transmitters 206 and the plurality of receivers 208 are connected to a processor 204. The processor 204 is configured to determine a three-dimensional image based on the object data detected by the plurality of receivers 208. The processor 204 may be any computer processing device configured to execute instructions stored on memory 212. The memory 212 may be a non-transitory computer-readable medium. The processor 204 may be a digital signal processor. The processor 204 may also be one or more processors configured to work in combination. In some embodiments, the receivers 208 determine the object data based on detected reflected signals. In some embodiments, the processor 204 determines the object data based on the emitted signals from the plurality of transmitters 206 and the detected reflected signals from the plurality of receivers 208.

The processor 204 may also render a visual representation of the three-dimensional image to be displayed on display 202. The visual representation of the three-dimensional image corresponds to the one or more objects in the scan volume. The display 202 may be any display device such as an LCD display screen or an LED display screen, for example.

A user, such as a police officer, may view the display 202 to identify whether a detected object is a weapon. Systems which generate a two-dimensional image may not provide a conclusive representation of the object in question, as many dangerous objects may look similar to non-dangerous objects in certain angles. For example, a knife may look similar to a pen when only the edge of the knife is visible. However, the system 200 generates a three-dimensional image, which may be viewed from multiple angles and viewpoints by the user to determine whether the object in question is a weapon. In some embodiments, the user uses an input device 214, such as a mouse, a joystick, a microphone, or a touchscreen, to rotate, zoom in and zoom out, and otherwise manipulate the generated three-dimensional image to inspect the object in question.

In some embodiments, when an object is detected, a supplemental sensing device 210 may be used to provide additional sensor data to assist in identifying the object. The supplemental sensing device 210 may be at least one of a camera or an infrared sensor. The data from the supplemental sensing device 210 may provide additional information to the user to assist the user in determining whether the object in question is a weapon. The supplemental sensing device 210 may be automatically triggered or may be triggered in response to an indication (e.g., from the input device 214).

In some embodiments, the processor 204 is configured to automatically determine whether the detected object is a weapon. The processor 204 may use machine learning techniques and training data to determine whether a detected object is a weapon. In some embodiments, a user may identify, using the input device 214, whether a detected object is a weapon, and this identification may be used as feedback to the processor 204 to further refine the ability of the processor 204 to accurately identify weapons. In some embodiments, the processor 204 provides a confidence value associated with a determination of whether the object in question is a weapon, and the confidence value is used to determine whether to take action.

In some embodiments, an alarm or other warning may be automatically activated in response to the detection of a weapon. The alarm may be broadcast to everyone in the vicinity of the detected weapon, or the alarm may be transmitted to only certain individuals, such as police or security.

In some embodiments, the system 200 is embodied as a detection device configured to be connected to two or more walls, where the transmitters 206 and the receivers 208 are connected to the walls.

Figure 3:
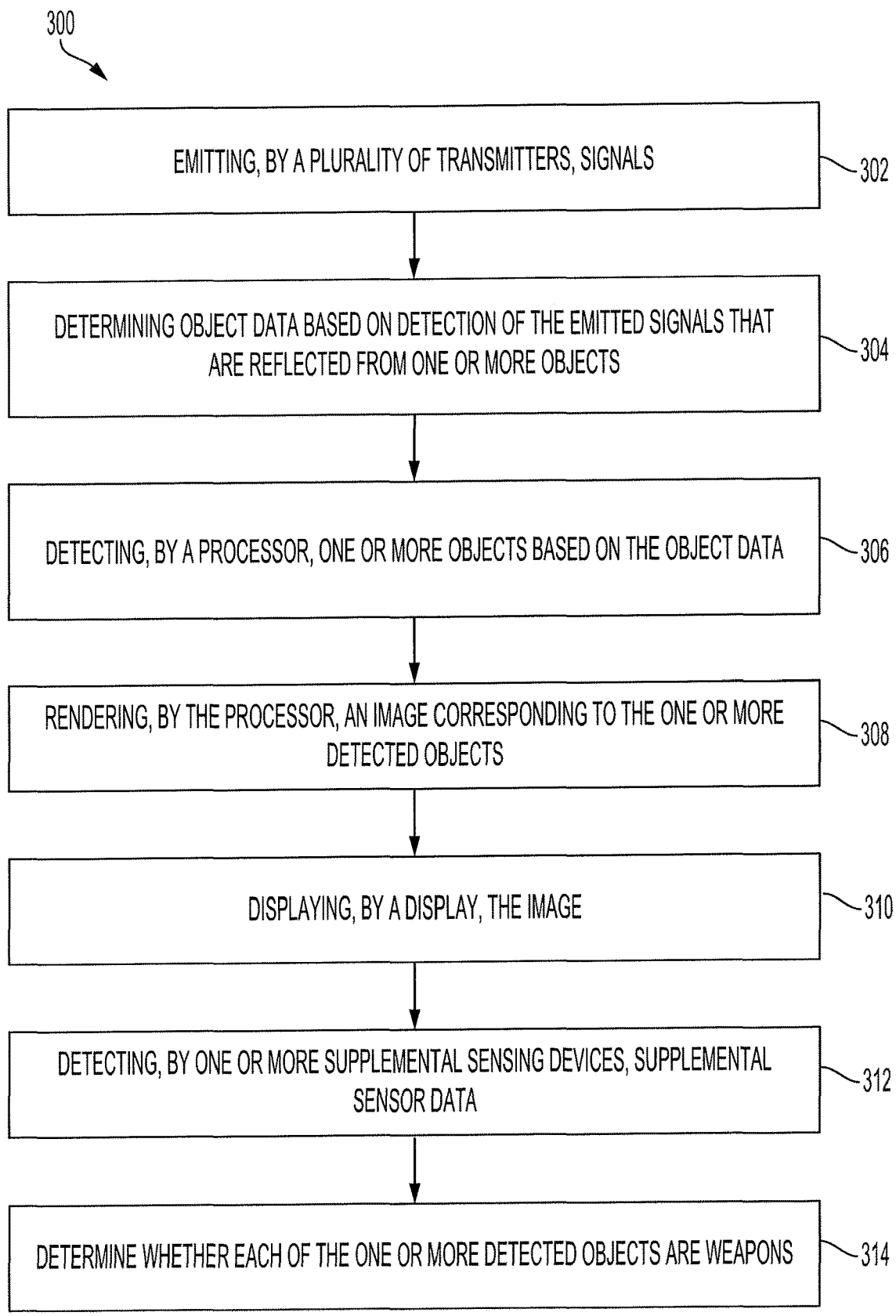
FIG. 3 is a flowchart of a process performed by the standoff detection system, according to various embodiments of the invention.

FIG. 3 is a flowchart illustrating a process 300 used by the system described herein.

A plurality of transmitters (e.g., transmitters 206) oriented in a respective plurality of directions emit signals, producing uniform millimeter wave illumination of a three-dimensional space (e.g., scan volume 102) (step 302).

Object data associated with one or more objects in the three-dimensional space is determined (step 304). The one or more objects in the three-dimensional space may reflect or scatter the signals emitted from the plurality of transmitters, and a plurality of receivers (e.g., receivers 208) may detect the reflected or scattered signals. The object data includes a direction, a phase, and a timing of signals reflected from one or more objects within the three-dimensional space. In some embodiments, the receivers determine the object data based on the detection of the reflected or scattered signals and the signals emitted from the transmitters. In some embodiments, a processor (e.g., processor 204) connected to the transmitters and the receivers determines the object data based on the detection of the reflected or scattered signals and the signals emitted from the transmitters.

A processor detects one or more objects in the three-dimensional space based on the object data (step 306). The processor may reconcile the object data and the location of the receivers and/or transmitters of all of the receivers and/or transmitters to calculate the location in three-dimensional space of the object. In particular, a plurality of points forming the surface of the object may be determined, with each point being a coordinate in three-dimensional space.

The processor renders an image corresponding to the one or more detected objects (step 308). A display (e.g., display 202) is configured to display the rendered image (step 310). The image may be shown on a two-dimensional display, and the user may be able to manipulate the image (e.g., zoom in, zoom out, turn) using an input device (e.g., input device 214) to inspect the image in three-dimensions. In some embodiments, the image may be shown using a display that shows the image as a three-dimensional output, such as a hologram. When the input device receives the manipulation input from the user, the processor adjusts the rendering of the image to correspond to the manipulation input. For example, when the user provides a manipulation input to turn the image clockwise, the processor may adjust the rendering of the image to turn clockwise, and the adjusted rendering is displayed by the display.

One or more supplemental sensing devices (e.g., supplemental sensing device 210) are used to detect supplemental sensor data associated with the one or more detected objects (step 312). The detection of the supplemental sensor data by the supplemental sensing devices may be automatically triggered by the processor upon detection of one or more objects. The processor may direct the one or more supplemental sensing devices to detect supplemental sensor data at a particular location in three-dimensional space where the one or more objects have been detected. The detection of the supplemental sensor data by the supplemental sensing devices may be manually directed by a user using the input device.

The supplemental sensing data may be rendered by the processor into a supplemental image and presented alongside or superimposed on top of the signal-based image rendered in step 308. This presentation of both the supplemental image and the signal-based image may provide further clarity for identifying the object.

A user or the processor determines whether each of the one or more objects in the three-dimensional space are weapons (step 314). As described herein, a human user may identify whether an object is a weapon based on human judgment, and the processor may identify whether an object is a weapon based on machine learning techniques and training data.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A detection system for a three-dimensional space defined by four walls, the detection system comprising:
    a plurality of transmitters oriented in a respective plurality of directions and configured to produce uniform millimeter wave illumination of the three-dimensional space, with at least one transmitter of the plurality of transmitters being located on each of the four walls;
    a plurality of receivers configured to determine object data including a direction, a phase, and a timing of signals reflected from one or more objects within the three-dimensional space, with at least one receiver of the plurality of receivers being located on each of the four walls; and
    a processor configured to:
        receive the object data,
        detect the one or more objects in the three-dimensional space based on the object data, and
        render an image corresponding to the one or more detected objects.

2. The detection system of claim 1, wherein the plurality of transmitters are electronically steered antenna arrays.

3. The detection system of claim 1, wherein the plurality of receivers are integrated transceiver/modem systems.

4. The detection system of claim 1, wherein the processor is a digital signal processor.

5. The detection system of claim 1, further comprising a display configured to display the rendered image corresponding to the one or more detected objects.

6. The detection system of claim 1, further comprising one or more supplemental sensing devices configured to detect supplemental sensing data corresponding to the one or more detected objects,
    wherein the processor is further configured to render a supplemental image based on the supplemental sensing data, and
    wherein the display is further configured to display the supplemental image.

7. The detection system of claim 1, further comprising an input device configured to receive an input from a user for manipulating the image and causing the display to display a manipulated image based on the input from the user.

8. The detection system of claim 1, wherein at least two of the transmitters in the plurality of transmitters are not located coplanar to each other, and wherein at least two of the receivers in the plurality of receivers are not located coplanar to each other.

9. A method for detecting objects in a three-dimensional space defined by four walls, the method comprising:
    emitting, by a plurality of transmitters oriented in a respective plurality of directions, signals to produce uniform millimeter wave illumination of the three-dimensional space, with at least one transmitter of the plurality of transmitters being located on each of the four walls;
    determining, by a plurality of receivers, object data including a direction, a phase, and a timing of signals reflected from one or more objects within the three-dimensional space, with at least one receiver of the plurality of receivers being located on each of the four walls;
    detecting, by a processor, the one or more objects in the three-dimensional space based on the object data; and
    rendering, by the processor, an image corresponding to the one or more detected objects.

10. The method of claim 9, further comprising displaying, by a display, the rendered image corresponding to the one or more detected objects.

11. The method of claim 9, further comprising:
    detecting, by one or more supplemental sensing devices, supplemental sensing data corresponding to the one or more detected objects;
    rendering, by the processor, a supplemental image based on the supplemental sensing data; and
    displaying, by the display, the supplemental image.

12. The method of claim 11, wherein the detecting of the supplemental sensing data by the one or more supplemental sensing devices is performed automatically when the processor detects the one or more objects in the three-dimensional space.

13. The method of claim 9, further comprising receiving, by an input device, an input from a user for manipulating the image and causing the display to display a manipulated image based on the input from the user.

14. A detection device comprising:
    a plurality of transmitters oriented in a respective plurality of directions and configured to produce uniform millimeter wave illumination of a three-dimensional space defined by four walls, with at least one transmitter of the plurality of transmitters being configured to be placed on each of the four walls;
    a plurality of receivers configured to determine object data including a direction, a phase, and a timing of signals reflected from one or more objects within the three-dimensional space, with at least one receiver of the plurality of receivers being configured to be placed on each of the four walls; and
    a processor configured to receive the object data, detect the one or more objects in the three-dimensional space based on the object data, and render an image corresponding to the one or more detected objects.

15. The detection device of claim 14, wherein the plurality of transmitters are electronically steered antenna arrays attached to two or more walls.

16. The detection device of claim 14, wherein the plurality of receivers are integrated transceiver/modem systems.

17. The detection device of claim 14, wherein the processor is a digital signal processor.

18. The detection device of claim 14, further comprising a display configured to display the rendered image corresponding to the one or more detected objects.

19. The detection device of claim 14, further comprising one or more supplemental sensing devices configured to detect supplemental sensing data corresponding to the one or more detected objects,
    wherein the processor is further configured to render a supplemental image based on the supplemental sensing data, and
    wherein the display is further configured to display the supplemental image.

20. The detection system of claim 1, wherein:
    the plurality of receivers are configured to determine object data from two or more objects within the three-dimensional space; and
    the processor is configured to:
        detect the two or more objects in the three-dimensional space based on the object data, and
        render an image corresponding to the two or more detected objects.

\* \* \* \* \*